United States Patent

[11] 3,545,413

| | | |
|---|---|---|
| [72] | Inventor | Daniel A. Freitas<br>2312 Palmira Way, San Jose, California 95122 |
| [21] | Appl. No. | 738,551 |
| [22] | Filed | June 20, 1968 |
| [45] | Patented | Dec. 8, 1970 |

[54] ROTARY ENGINE
6 Claims, 8 Drawing Figs.

[52] U.S. Cl. .................................................. 123/8.01,
123/8, 17, 103/140
[51] Int. Cl. .................................................. F02b 53/08
[50] Field of Search .......................................... 123/8,
8(MS), 8(MC), 16, 17; 103/140

[56] References Cited
UNITED STATES PATENTS

| | | | | |
|---|---|---|---|---|
| 2,081,812 | 5/1937 | Hapkins | ................ | 103/140 |
| 2,373,304 | 4/1945 | Garbeth | ................ | 123/8(MS)UX |
| 2,812,748 | 11/1957 | Simonian | ................ | 123/8(MS)UX |

*Primary Examiner* — Allan D. Herrmann
*Attorney* — Jack W. Edwards

ABSTRACT: A rotary engine includes separate compression and expansion chambers that are connected in flow communication by an ignition chamber. Within the compression chamber, a first rotor is provided for compressing a measured charge of fuel-air mixture into the ignition chamber. There the charge is fired and expanding gases from the ignition chamber flow through the expansion chamber driving a second rotor. The first and second rotors are connected by gear means for rotation relative to each other so that a measured charge of fuel-air mixture is compressed and ignited for a given amount of rotation of the second rotor.

PATENTED DEC 8 1970
3,545,413
SHEET 1 OF 3
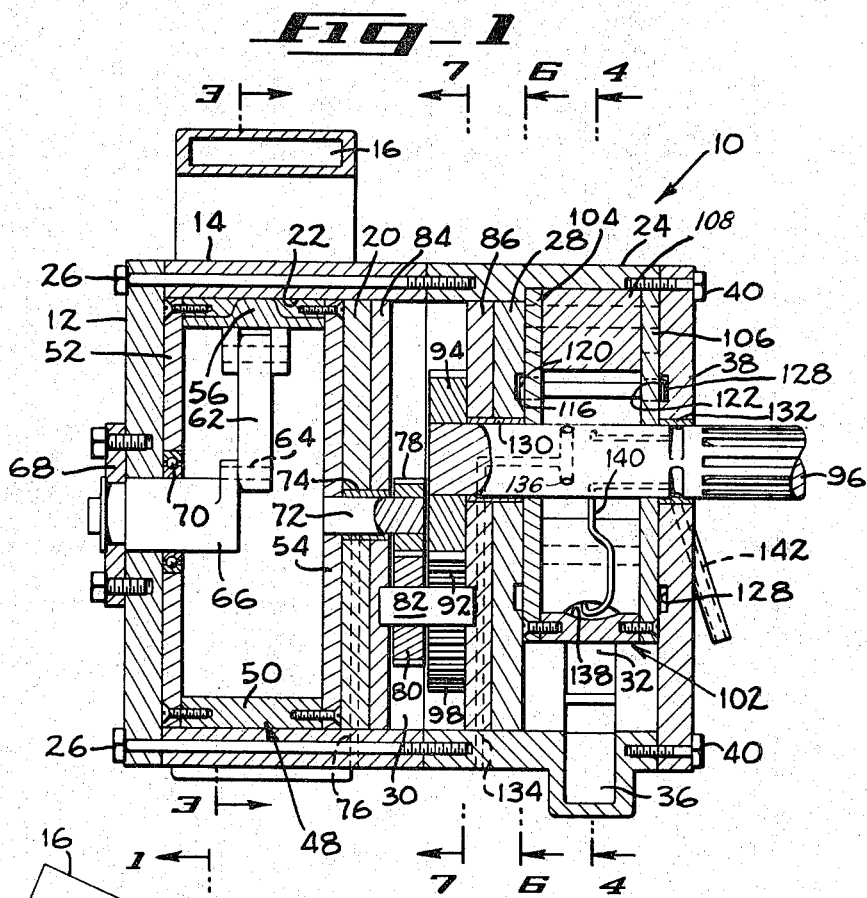
Fig_1
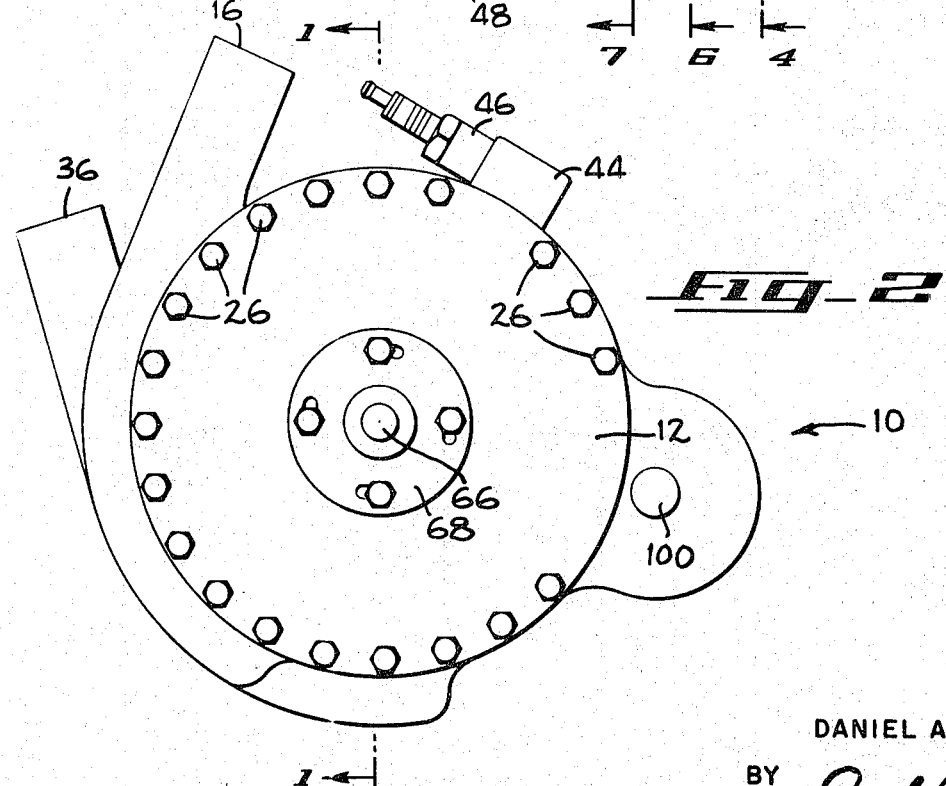
Fig_2
INVENTOR
DANIEL A. FREITAS
BY Jack W. Edwards
ATTORNEY

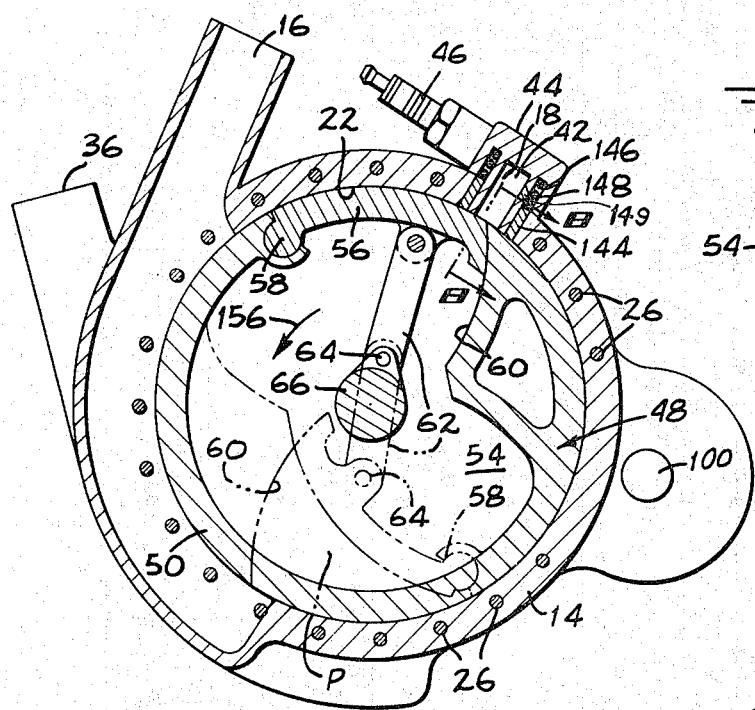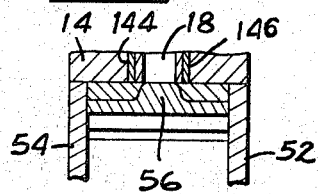

ROTARY ENGINE

BACKGROUND OF THE INVENTION

1. Field of the Invention

This invention relates to rotary engines and more particularly to an internal combustion engine in which a measured charge of fuel-air mixture is compressed, ignited and the reexpansion thereof drives a rotor-type piston.

2. Description of the Prior Art

Rotary-type engines are known where compression and expansion take place in a single chamber during different arcs of rotation. A large percentage of the available arc of rotation is consumed for compression and scavenging and thus the expansion stroke is limited. Gas turbines are known to have separate compression, ignition and expansion chambers but instead of firing a measured charge of fuel-air mixture, a gas pressure differential in maintained between inlet and outlet of the expansion chamber and the kinetic energy of the gas moving at high velocity turns the rotor. The gas pressure differential can not be readily varied in the range where the kinetic energy of the gas is slightly above the resistance of the rotor. Thus, the gas turbine does not have flexibility for low-speed operation.

SUMMARY OF THE INVENTION

A rotary-type engine includes separate compression and expansion chambers with a rotor mounted in each chamber and each rotor connected by gear means for rotation relative to the other rotor. Upon one revolution of the compression chamber rotor, a measured charge of fuel-air mixture is compressed into the ignition chamber and there the charge is fired. Expanding gases from the fired charge flow through the expansion chamber driving the rotor therein through one-third of a revolution. The gear means connecting the rotors cause the rotor within the compression chamber to turn at a three to one ratio to the rotor within the expansion chamber. This enables a large volume of air to be compressed for each charge and expanding gases from the fired charges apply torque to the expansion chamber rotor almost continuously during one revolution. Since the same charge is fired for each partial revolution of the rotor, the pressure developed is the same at low speed as it is at high speed and thus this rotary engine has flexibility for low-speed operation

BRIEF DESCRIPTION OF THE DRAWING

FIG. 1 is a sectional view of a rotary engine embodying the present invention taken on line 1–1 of FIG. 2. A first rotor in a compression chamber is positioned for completion of a compression stroke, while a second rotor in an expansion chamber is positioned intermediately of the expansion stroke.

FIG. 2 is an end view looking at the compression chamber side of the rotary engine shown in FIG. 1.

FIG. 3 is a section taken on line 3–3 of FIG. 1.

FIG. 4 is a section taken on line 4–4 of FIG. 1.

FIG. 5 is a plan view of a vane which fits within the expansion chamber rotor as shown in FIG. 4.

FIG. 8 is a section taken on line 8–8 of FIG. 3.

DESCRIPTION OF THE PREFERRED EMBODIMENT

Figure 6:
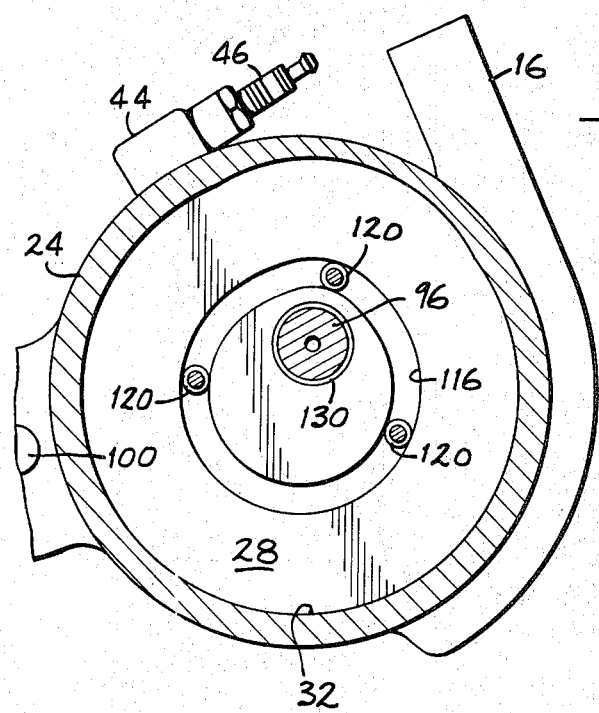
FIG. 6 is a section taken on line 6–6 of FIG. 1.

Looking now at FIG. 1, a rotary engine 10 is shown. A circular end plate 12 is bolted to a compressor casing 14 that has an intake port 16 and a discharge port 18 (FIG. 3). An intermediate plate 20 is fixed within the compressor casing and a compression chamber 22 is formed between the end plate and intermediate plate. These means defining the compression chamber represent but one way of forming a housing and it will be apparent that certain parts could be made integral or separate as desired.

A rotor casing 24 is connected to the compressor casing 14 by bolts 26 that extend through the compressor casing from end plate 12. An intermediate plate 28 is fixed within the rotor casing and a gear compartment 30 is formed within the connected casings between the intermediate plates 20 and 28. Means which define an expansion chamber 32 include the opposite side of intermediate plate 28, the interior of rotor casing 24 which has an inlet port 34 (FIG. 4) and an exhaust port 36, and an end plate 38 that is bolted to the rotor casing by bolts 40.

An ignition chamber 42 is shown in FIGS. 3 and 4 and is a passage providing flow communication between the compression chamber discharge port 18 and the expansion chamber inlet port 34. The ignition chamber is defined by means of a housing 44 that extends over the exterior of the compressor and rotor casings. A spark plug 46 is provided for igniting a charge of fuel-air mixture compressed within the ignition chamber.

A first rotor 48 fits within the compression chamber 22, as shown in FIGS. 1 and 3. This rotor includes a generally cylindrical portion 50 that is sandwiched between end plates 52 and 54. Along the periphery of the cylindrical portion is a compression plate 56 that is hinged at 58 and slideably fitted against an arcuate flange 60. The compression plate is connected by a link 62 to a pin 64 that is eccentric to the first rotor. Thus, upon rotation of the rotor thru a 180° arc, the compression plate moves from a closed position, as shown in section in FIG. 3, to an open position, as indicated in phantom line in the same FIG.

Pin 64 is eccentrically fixed to the end of a shaft 66 which is concentric with the first rotor 48. This shaft extends through end plate 12 and is secured to a mounting plate 68 that is bolted to the end plate. A ball bearing assembly 70 is fitted between end plate 52 and the shaft, to enable the first rotor to turn freely thereon. A shaft 72 projects from the rotor end plate 54 through intermediate plate 20 and a sleeve bearing 74 is fitted between the intermediate plate and shaft 72. Oil is supplied to the bearing surface between shaft 72 and bearing 74 through a passage 76 in intermediate plate 20. The rotor turns upon shaft 66 while shaft 72 turns within the sleeve bearing.

Figure 7:
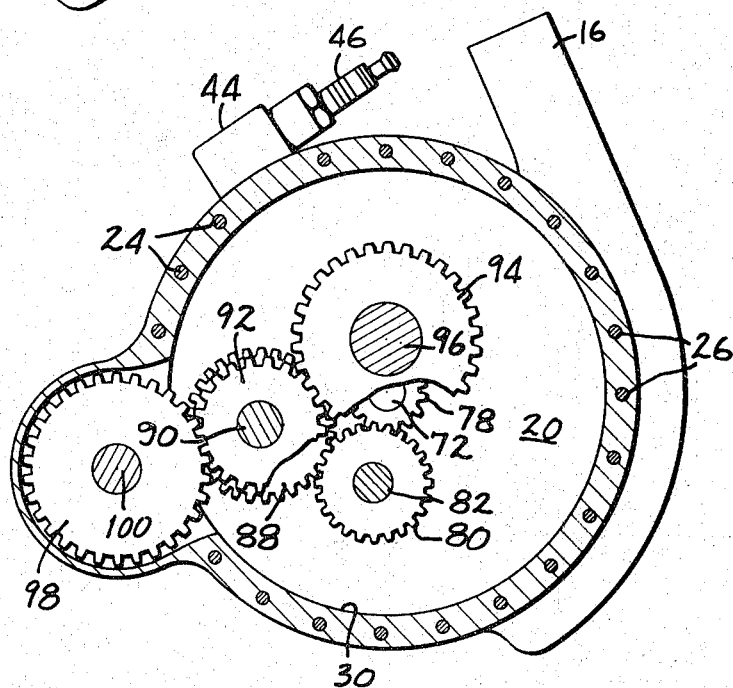
FIG. 7 is a section taken on line 7–7 of FIG. 1 with portions of the gears broken away to show underlying gears.

Shaft 72 extends into gear compartment 30 and a first gear 78 having 16 teeth is mounted thereon. A second gear 80 having 24 teeth is in mesh with the first gear and is rotatably mounted on a shaft 82 extending between mounting plates 84 and 86. A third gear 88 (FIG. 7) having 32 teeth is in mesh with the second gear and is keyed to a shaft 90. Also keyed to this shaft is a fourth gear 92 having 20 teeth. A fifth gear 94 having 30 teeth is in mesh with the fourth gear and mounted on the main drive shaft 96, while a sixth gear 98 having 30 teeth is also in mesh with the fourth gear and mounted on a distributor drive shaft 100. The gear ratio causes the shaft 72 to make 3 revolutions for each revolution of the main drive shaft or distributor drive shaft.

A second rotor 102 is fixed to the main drive shaft 96 within the expansion chamber 32. This rotor includes end plates 104 and 106 that are bolted to opposite ends of a center casting 108. Radial slots 110, 112, and 114 are provided in the rotor at 120° spacing about the periphery of the rotor, as shown in FIG. 4. Sliding vanes 117, 118 and 119 are fitted within the respective radial slots and project outwardly from the periphery of the rotor to divide the expansion chamber into three separate compartments.

A typical vane 118 is shown in detail in FIG. 5. A rod 119 is welded to one end of the vane and a pair of bushings 120 and 122 are fitted about opposite ends of the rod. The side edges of the vane are slotted and the slots contain seals 124, 125 and 126 made of wear resistant material that projects outward beyond the side edges of the vane. These seals are resiliently urged outward to contact intermediate plate 28, end plate 38 and the inner surface of rotor casing 24, as shown in FIG. 1.

The vanes 117, 118 and 119 are guided to move radially in and out of slots 110, 112 and 114, respectively, upon rotation of the second rotor 102 so as to follow the inner surface of rotor casing 24. Bushing 120 fits within a groove 116 in intermediate plate 28 and bushing 122 fits within a similar groove 128 in end plate 38. Groove 116 is shown in side elevation in FIG. 6 with bushings 120 positioned therein for the respective vanes. Thus, it will be seen that the groove serves as a cam track to guide the bushings for moving the vanes. Sliding friction between the vane 117 and the center casting 108 is reduced by roller bearings 127 and 129 positioned on opposite sides of the vane. Similarly, roller bearings 127a and 129a are positioned on opposite sides of vane 118 and roller bearings 127b and 129b are positioned on opposite sides of vane 119.

Main drive shaft 96, shown in FIG. 1, fits within a sleeve bearing 130 in intermediate plate 28 and a sleeve bearing 132 in end plate 38. Lubrication for these sleeve bearings and the moving parts within expansion chamber 32 is provided by an oil supply system that will now be described. A passage 134 extends inward from the exterior of rotor casing 24 on a radial line through plate 86 and bearing 130. The main drive shaft is slotted about the circumference and has three passages extending radially inward spaced at 100° intervals. These passages converge at the center of the shaft and a single passage extends axially of the shaft to a position within the expansion chamber. There, three passages extend radially outward to openings 136. Oil forced through the passages is sprayed outward from the openings lubricating the vanes 117, 118 and 119. Indentations 138 are provided in the inner face of the center casting midway between vanes and oil tends to collect at these points. A suction line 140 made of small tubing projects outward from the main drive shaft to each of the indentations for drawing the oil back into the drive shaft. Three passages extend longitudinally of the drive shaft from the suction lines to within sleeve bearing 132. Here the shaft is slotted about the circumference and a passage 142 extends outward through the sleeve bearing and end plate.

To prevent expanding gases from the ignition chamber from entering the compression chamber, a cylindrical ring seal 144 is fitted into a corresponding cylindrical slot 146 located about discharge port 18, as shown in FIG. 3. A spring 148 is positioned within the slot to urge the seal towards the first rotor 48 and a vent 149 opening from the ignition chamber 42 into the slot behind the seal maintains the same gas pressure behind the seal as on the compression chamber side thereof. The diameter of the seal is greater than an opening in the outer periphery of the first rotor through which a measured charge of fuel air mixture is compressed by compression plate 56 into discharge port 18. Thus, the seal is held out of contact with the leading edge of arcuate flange 60.

In operation, the first rotor 48 rotates in a counterclockwise direction, as indicated by an arrow 156 in FIG. 3. Compression plate 56 moves from a closed position to an open position, as indicated in phantom line and a pocket P is formed between the compression plate and arcuate flange 60. Fuel-air mixture is drawn into the pocket until the arcuate flange seals the intake port 16. Continued rotation of the rotor causes the compression plate to pivot outward compressing the fuel-air mixture against the interior of the compressor casing. The charge is then forced through discharge port 18 which is then blocked by the rotor upon continued rotation.

The charge of fuel-air mixture passes from discharge port 18 into ignition chamber 42 driving burned gases ahead of the charge. At this time, one of the vanes 117, 118 or 119 is positioned immediately below inlet port 34 in the expansion chamber 32. The fuel-air mixture is then ignited by spark plug 46 and the expanding gases drive the vane and second rotor 102 in the direction indicated by arrow 157 in FIG. 4. In this view, vane 117 is positioned about midway through the expansion stroke which continues until expanding gases behind the vane reach access to exhaust port 36.

It will be noted that the expansion stroke occurs during approximately one-third of a revolution of the second rotor 102. The following vane 119 would then be positioned for another expansion stroke, while the first rotor in the compression chamber has made 1 complete revolution and has compressed a fresh charge of fuel-air mixture into the ignition chamber. The cycle is then repeated with vane 119 moving through one-third of a revolution while the first rotor compresses another charge of fuel-air mixture into the ignition chamber.

It will be understood that modifications and variations of the embodiment of the rotary engine disclosed herein may be resorted to without departing from the spirit of the invention.

Having thus described my invention, what I claim as new and desire to protect by Letters Patent is:

I claim:

1. A rotary engine comprising:
   means defining a compression chamber having intake and discharge ports;
   a first rotor mounted within said compression chamber for compressing a charge of fuel-air mixture;
   means defining an expansion chamber having inlet and exhaust ports;
   means defining an ignition chamber in flow communication between the discharge port of said compression chamber and the inlet port of said expansion chamber;
   a second rotor mounted within said expansion chamber and driven by expanding gases from said ignition chamber; and
   gear means connecting said first and second rotors in a differential driving relation;
   said first rotor within the compression chamber seals the ignition chamber for firing after a charge of fuel-air mixture has been compressed into the ignition chamber.

2. A rotary engine as described in claim 1, wherein said gear means cause the first rotor within the compression chamber to turn at a rate of 3 revolutions per 1 revolution of the second rotor within the expansion chamber.

3. A rotary engine as described in claim 1, wherein the second rotor within the expansion chamber turns in a clockwise direction when looking from the front of the engine towards the main drive shaft and the first rotor within the compression chamber turns in a counterclockwise direction when looking from the same direction.

4. A rotary engine as described in claim 1, wherein said first rotor includes a cylindrical portion that rotates about an axis and a compression plate pivotably connected to the cylindrical portion for rotation with the first rotor and linked to a pin eccentrically mounted from the axis for pivotal movement radially of the first rotor.

5. A rotary engine as described in claim 1, including vanes slidably mounted in the second rotor, and said means defining an expansion chamber having a plurality of grooves therein forming a plurality of cam tracks for guiding said vanes.

6. A rotary engine as described in claim 5, including a drive shaft upon which said second rotor is concentrically mounted, said drive shaft having oil passages therein for lubrication of the slidably mounted vanes.